Dec. 20, 1960  J. W. HUDSON  2,964,882
DUCT OUTLET INSERT AND TOOL FOR OPENING SAME
Filed July 22, 1957  3 Sheets-Sheet 1

INVENTOR.
James W. Hudson
BY
Cromwell, Greist & Warden
Attys.

Dec. 20, 1960   J. W. HUDSON   2,964,882
DUCT OUTLET INSERT AND TOOL FOR OPENING SAME
Filed July 22, 1957   3 Sheets-Sheet 2
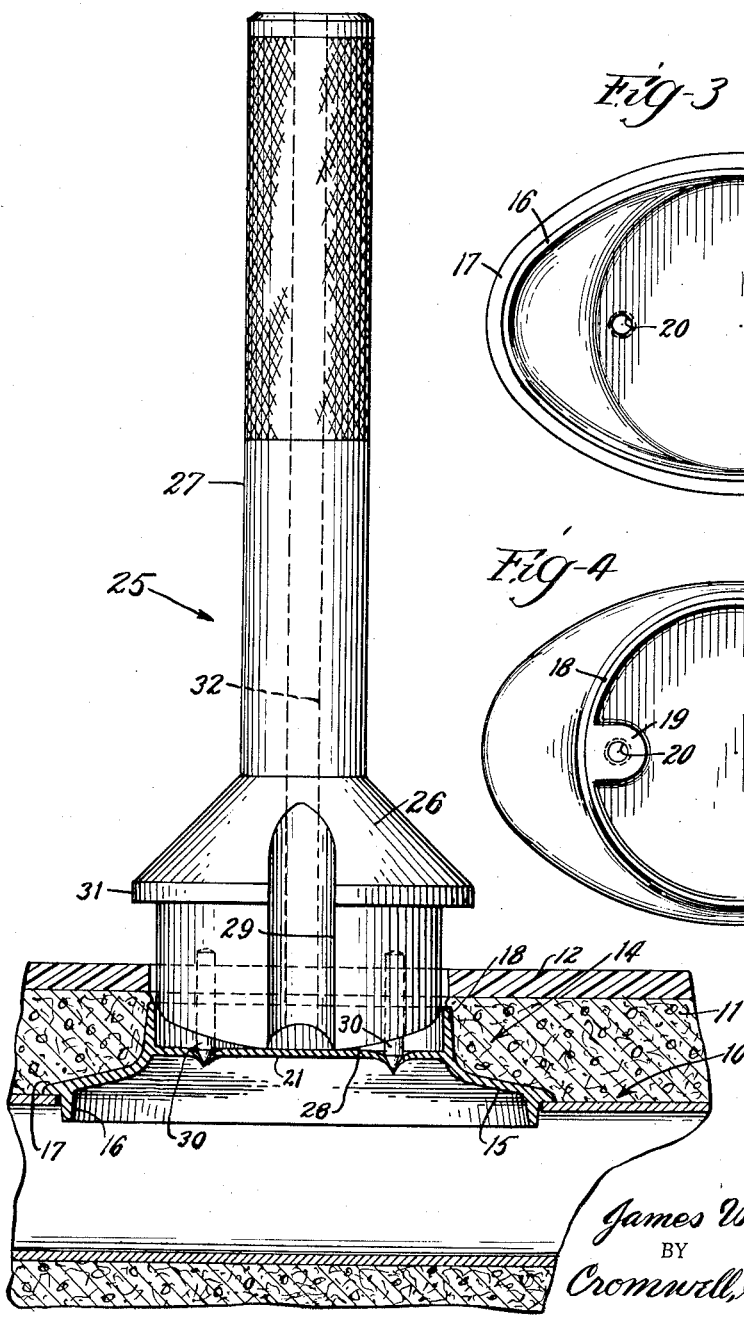
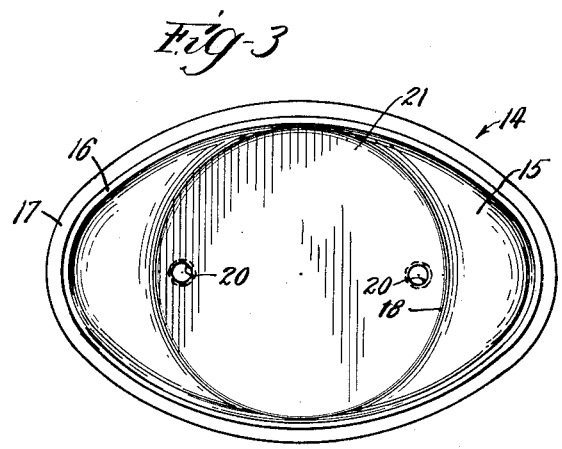
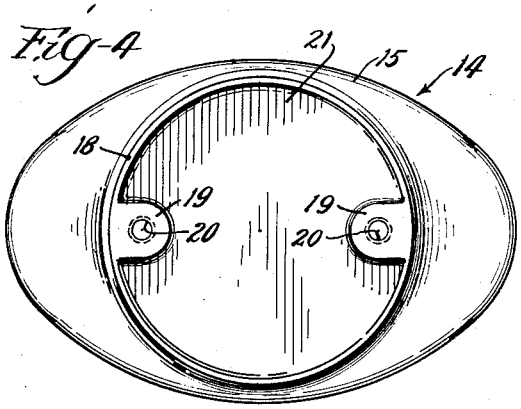
INVENTOR.
James W. Hudson
BY
Cromwell, Greist & Warden
Attys.

Dec. 20, 1960  J. W. HUDSON  2,964,882
DUCT OUTLET INSERT AND TOOL FOR OPENING SAME
Filed July 22, 1957  3 Sheets-Sheet 3
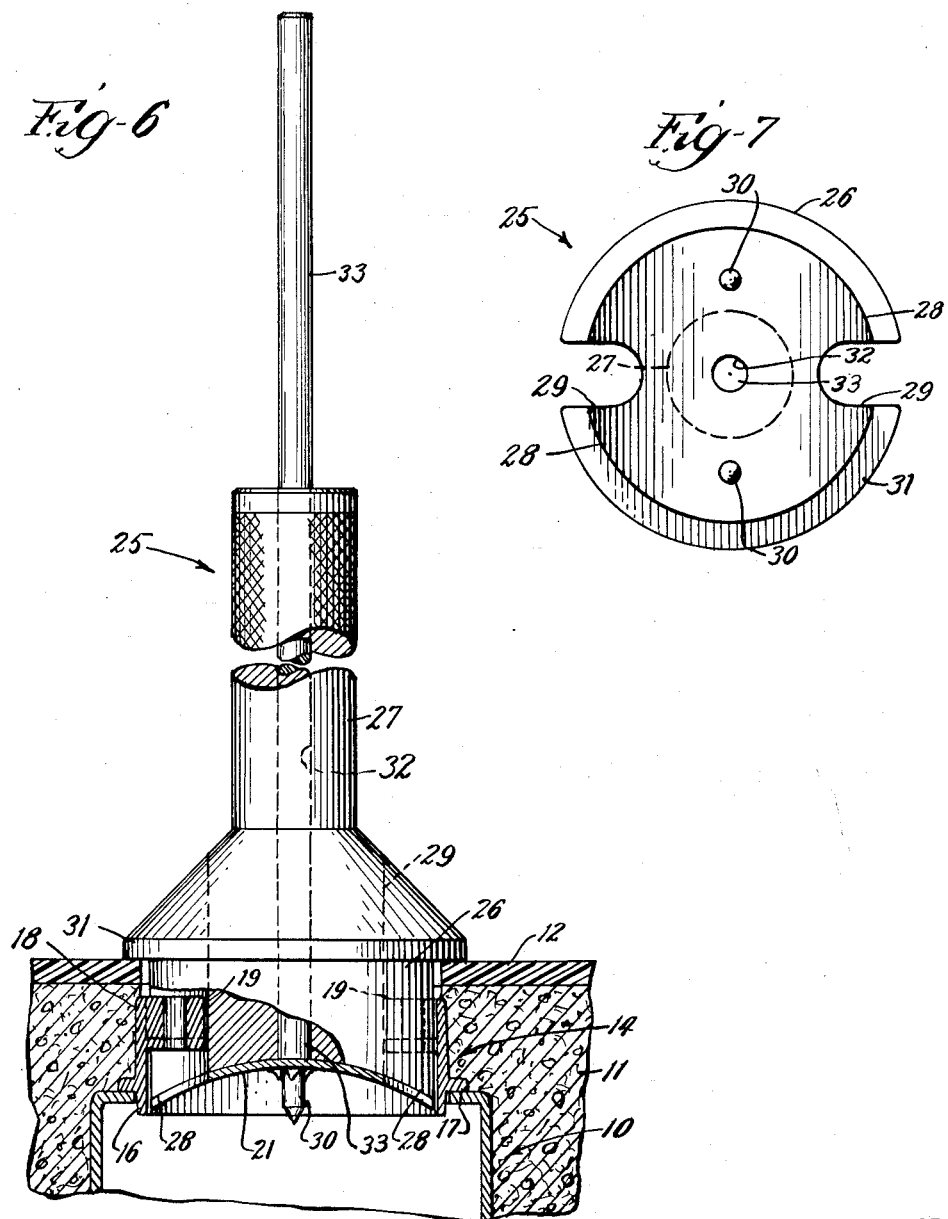
INVENTOR.
James W. Hudson
BY
Cromwell, Greist & Warden
Atty.

United States Patent Office 2,964,882
Patented Dec. 20, 1960

2,964,882

DUCT OUTLET INSERT AND TOOL FOR OPENING SAME

James W. Hudson, Elmhurst, Ill., assignor, by mesne assignments, to The National Supply Company, a corporation of Ohio Filed July 22, 1957, Ser. No. 673,476

11 Claims. (Cl. 50—72)

The present invention is directed to a new and improved duct outlet insert for attachment to an element of an underfloor wire distribution system, the insert being aligned with an opening in the element in covering relation and having locating means carried thereby extending to the top of the flooring material in which the wire distribution system and insert are buried, the invention being further directed to a tool for use in readily removing a portion of the insert to gain access into the interior of the wire distribution system for the wiring of a fitting which is fixedly held on the top surface of the flooring material by the insert upon installation of the fitting.

In the use of underfloor wire distribution systems, initial installation includes the burying of the elements, thereof including junction boxes and wire distributing ducts in the permanent flooring structure of the building. The number of ducts used and the location and direction of the same determines the extent to which the system can be utilized and the number of outlets provided for use by the occupants of the building. An important object in utilizing such systems is to provide an adequate number of openings in the numerous ducts through which wires can be pulled or fed for fitting wiring purposes, the fittings being mounted on the top surface of the floor in predetermined spaced relation. In order to initially install an underfloor system which can be readily adapted to changing needs of the inhabitants of the building over an extended period of time, it has been found desirable to provide the ducts with a number of wire feeding openings which can be subsequently utilized when need arises. The top wall of each duct is provided with an opening which if not immediately used is covered by a duct insert to prevent the entry of fresh cement or water into the duct and into the system during the pouring of the concrete in the forming of the floor structure with the wire distribution system buried therein.

The insert used in covering an opening in a duct must be water-tight and should preferably be provided with some means for locating the same following completion of the floor structure. In subsequent installation of fittings it is necessary to locate the particular duct openings as defined by the inserts and remove the flooring material sufficiently to gain access into the opening in the duct. Not all of the openings will be initially used for installation of fittings and it is desirable to provide a number of such openings for subsequent use when it is necessary to rearrange fitting location to accommodate new equipment or revise the floor plan. Thus, a number of the duct openings covered by the inserts are not initially used for the mounting of fittings but are nevertheless available for subsequent rearrangement of fitting location. The type of insert used in covering these openings must therefore be capable of fully protecting the interior of the underfloor system over a substantial period of time and yet be readily located for use when desired.

Different forms of duct opening inserts have been used with varying degrees of success. In most instances the insert utilized is of the type which is threadedly received within a collar portion surrounding an opening in the duct. Upon installation of a fitting it is necessary to uncover such an insert and threadedly remove the same to expose the opening in the duct. Over an extended period of time, inserts of this type are often quite difficult to remove and in many instances some destructive action must be taken in order to gain access into the interior of the duct. Corrosion is not uncommon and the presence of any appreciable degree of corrosion often results in sufficient destruction of the mating threads preventing ready removal of the insert. Still further, in exposing the insert it is often necessary to remove a substantially large amount of floor material surrounding the same in order to provide for sufficient space to mechanically rotate or move the insert out of covering relation with the opening in the duct.

In many instances the commercial form of insert is designed solely for the purpose of sealing the opening in the duct. Once the opening is exposed for the purpose of mounting a fitting thereto, the insert is no longer useful and is thrown away. The threaded opening in the duct must then receive a threaded standpipe or adaptor therein which is specially designed for attaching the fitting thereto. This type of arrangement not only results in a complete loss in further usefulness of the insert but further requires the use of an additional element of the standpipe or adaptor variety to properly attach the electrical fitting in communication with the interior of the duct. It can be readily appreciated that where threaded standpipes or adaptors are used for attaching an electrical fitting to a duct, the efficient use of the same is dependent largely upon the condition of the threads carried by the opening in the duct. If the electrical fitting is installed several years after the floor structure has been completed with the underfloor wire distribution system buried therein, the threads carried by the opening in the duct may be sufficiently destroyed by corrosion or otherwise substantially inoperative so as to materially interfere with ready and efficient installation of an electrical fitting.

It is an object of the present invention to provide a new and improved form of duct insert for use in completely sealing an opening in an element of an underfloor wire distribution system, the duct insert being provided with integrally formed means which function not only to carry location marking means but also to attach an electrical fitting in alignment with the opening in the duct for operative use of the same, the duct insert having a partition forming a part thereof which is readily removable by the use of a tool which also forms a part of the present invention.

A further object is to provide a new and improved duct outlet insert for use with an opening in a duct, the insert being capable of completely enclosing the opening in water-proofing relation and further being capable of functioning as an electrical fitting attaching adaptor when a portion of the insert is removed therefrom to expose the opening in the duct for electrical fitting alignment therewith.

Another object is to provide a new and improved duct outlet insert adapted to completely enclose an opening in a duct, provide means for locating the position of the opening at the surface of the floor structure in which the duct is buried, and further function as an attaching means for use in fixedly mounting an electrical fitting in operative alignment with the opening in the duct, the insert incorporating structural features which function not only to completely seal the opening in the duct in water-tight relation but further allow ready accessibility into the duct for wire pulling or feeding purposes without requiring removal of the insert therefrom.

An additional object is to provide a special form of tool designed for use with the duct opening insert of the present invention, the tool efficiently functioning to readily remove an integral partition portion of the insert for the purpose of gaining access into the interior of the duct through the opening therein covered by the insert for electrical fitting alignment therewith.

Other objects not specifically set forth will become apparent from the following detailed description made in conjunction with the drawings wherein:

Fig. 3 is a bottom plan view of the insert;

Fig. 4 is a top plan view of the insert;

Fig. 5 is a fragmentary, partly sectioned elevation of the insert in mounted relation in an opening in a duct and the tool of the present invention, this view illustrating the positioning of the tool in its initial operative relation with the insert to expose the opening in the duct for electrical fitting attachment and alignment therewith;

Fig. 6 is a fragmentary, partly sectioned elevation taken at right angles to Fig. 5 illustrating further structural features of the tool and the manner in which it functions to expose the opening in the duct for electrical fitting attachment purposes;

Fig. 7 is a bottom plan view of the tool of Figs. 5 and 6.

Figure 1:
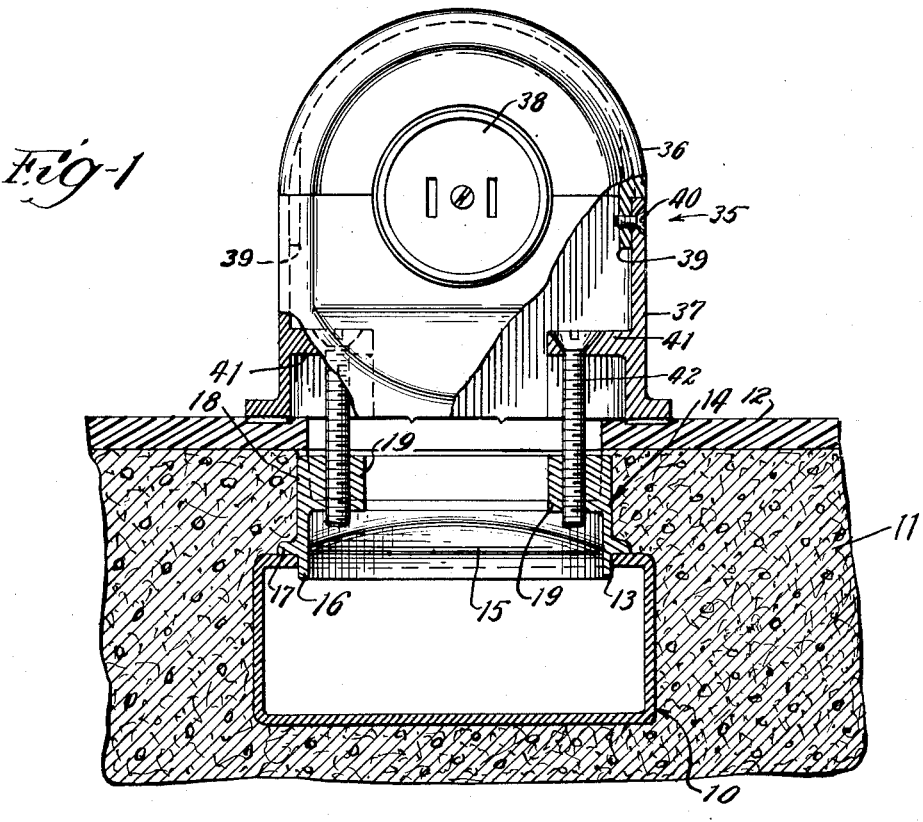
Fig. 1 is a fragmentary and partly sectioned elevation of an electrical fitting and underfloor wire distribution system duct being interconnected in operative relation by means of the duct opening insert of the present invention.
Figure 2:
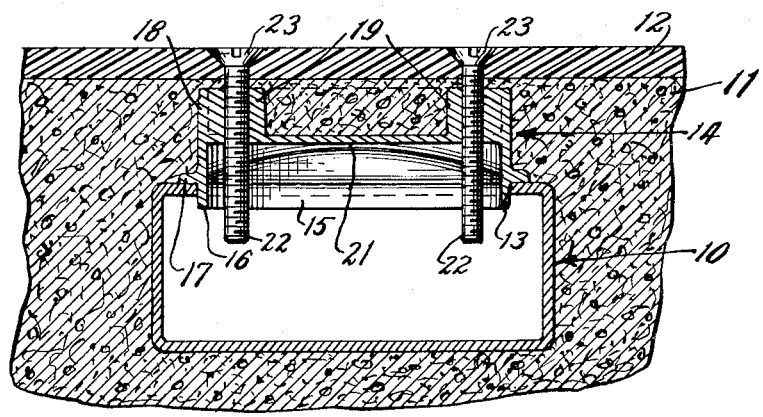
Fig. 2 is a view similar to Fig. 1 illustrating the functioning of the insert in sealing the opening in the duct, the location of which is marked by means carried by the insert.

In Figs. 1 and 2 a standard form of duct element 10 is illustrated in buried relation within a concrete sub-flooring 11 the top surface of which is provided with floor covering material 12 such as linoleum or tile. The duct 10 is of generally rectangular shape and is provided in the top wall thereof with an oval shaped opening 13 which receives therein an insert 14 constituting a part of the present invention.

Referring particularly to Figs. 1-4, the inset 14 is formed from a radially directed, flange-like base portion 15 which is of oval outline and is provided with a semi-elliptical shape as particularly shown in Fig. 5. The bottom surface of the base portion has integrally formed therewith a depending flange 16 which is located inwardly of the outer periphery of the base portion to define a circumferential shoulder 17. The base portion 15 has integrally formed therewith centrally thereof an upstanding cylindrical wall portion 18 which extends upwardly from the top surface of the base portion 15. The inner surface of the wall portion or collar 18 has integrally formed therewith spaced inwardly projecting lug-like attaching members 19 which are oppositely located for a purpose to be described. The lugs or projections 19 are provided with vertically directed tapped holes 20 extending completely therethrough. A circular partition 21 closes off the area defined by the wall portion 18 and coincides with the bottom surfaces of the projections 19 being formed integral therewith and with the inner surface of the wall portion 18.

The insert 14 is of one-piece construction readily adapted for formation by die casting with the formation of the tapped holes 20 in the projections being the only finishing operation necessary to complete the insert. As particularly shown in Figs. 1, 2, 5 and 6, the bottom surface of the shoulder 17 is received in resting engagement with the top surface of the duct 10 with the depending flange 16 received within the duct opening 13 when the insert 14 is mounted in its operative position. The opening 13 as previously described is of oval shape to conform with the outline of the flange 16 and the insert 14 may be fixedly attached to the duct 10 by any suitable means such as welding or soldering.

As shown in Fig. 2, during initial installation of the underfloor wire distribution system including the duct 10, the insert 14 is suitably attached to the duct to completely close the opening 13 therein and seal the same in water-tight condition. Locating screws 22 are threadedly received within the holes 20 of the projections 19 with the flat heads 23 thereof located well above the top surface of the floor to be formed. The concrete sub-flooring 11 is then poured and allowed to set up about the underfloor wire distribution system including the duct 10 in the known manner and the duct and insert 14 is completely enclosed in concrete with the top cup-shaped portion of the insert, as defined by the wall portion 18 and partition 21, being filled with flooring material. Following the hardening of the concrete sub-flooring 11, the screws 22 are removed and passed through holes in the floor covering 12 which are aligned with the holes 20 of the projections 19. The floor covering 12 is then suitably applied to the top surface of the sub-flooring 11 in finished condition and the screws 22 are threadedly advanced through the projections 19 until the flat heads 23 thereof are arranged in flush relation with the top surface of the floor covering 12. In this manner the top surfaces of the heads 23 of the screws 22 are readily observable for purposes of locating the insert 14 and the opening 13 in the duct 10.

With the arrangement shown in Fig. 2, a plurality of openings 13 may be provided for use at any time subsequent to the complete formation of the floor structure. During initial installation of the underfloor wire distribution system, it is desirable to provide an excess of openings 13 with inserts 14 attached to meet changing requirements in electrical fitting location during extended use of the floor structure. Thus, whenever it is desired to relocate or provide an additional service fitting, it is necessary merely to locate an opening 13 by means of the flat heads 23 of the screws 22 and attach the fitting in alignment with the opening 13 in a manner to be described. During non-use of the opening 13, the insert 14 covering the same completely protects the interior of the duct 10 from moisture or any other undesirable foreign matter. The only seams used in sealing the insert 14 in the opening 13 is that defined by the contacting surface of the shoulder 17. The combined surface sealing area provided by the shoulder 17 and flange 16 provides for complete water-tight sealing, all of the other parts of the insert 14 including the partition 21 being integrally interconnected. By use of the insert 14 the interior of the duct 10 is fully protected during and subsequent to floor structure formation.

Figs. 5-7 illustrate a form of tool 25 which is particularly adapted for use in removing the partition 21 of the insert 14 when it is desired to attach an electrical fitting thereto in communication with the interior of the duct 10. The tool 25 functions to shear the partition 21 from integral attachment with the inner surface of the wall portion 18 and projections 19. To provide for this shearing action, a solid circular shearing element 26 is formed integral with an elongated handle 27. The bottom surface of the shearing portion 26 is of generally concave configuration to define oppositely located shearing edges 28 of convex configuration. The lower part of the shearing portion 26 is receivable within the wall portion 18 of the insert 14 following removal of the floor covering 12 and sub-flooring 11 in association therewith to expose the same. The depending shearing edges 28 are centrally recessed to define grooves 29 which are closely received about the projections 19 when the tool 25 is moved toward engagement with the partition 21 of the insert 14. The bottom surface of the shearing portion 26 carries downwardly depending punch elements 30 which are sharpened at their outermost ends and which extend downwardly beyond the shearing edges 28.

When the tool 25 is introduced into the wall portion 18, the punches 30 initially contact the partition 21 and are suitably forced therethrough as shown in Fig. 5. The projections 19 are received within the grooves 29 to prevent damage to the same while allowing further downward travel of the bottom part of the shearing portion 26 within the wall portion 18 of the insert 14. The shearing edges 28 contact the partition 21 at its point of integral attachment with the wall portion 18 and continued driven downward movement of the tool 25 results in shearing of the partition 21 from the wall portion 18 and projections 19. With the complete separation of the partition 21 as shown in Fig. 6, the slug formed thereby conforms to the concave configuration of the bottom surface of the shearing portion 26. The bending of the slug results in distortion of the same and a pinching of the punch elements 30 to facilitate slug removal. The slug is thus frictionally held by the punches 30 and may readily be withdrawn therewith out of association with the insert 14. The extent of downward movement of the tool 25 is limited by a circumferentially continuous shoulder 31 formed integral with the shearing portion 26, the shoulder abutting the top surface of the floor surrounding the opening communicating with the insert 14.

The handle 27 and shearing portion 26 of the tool 25 is provided with a continuous bore 32 extending therethrough into communication with the bottom surface of the shearing portion 26. An ejecting rod 33 is movably received in the bore 32 and is of sufficient length to contact the inner surface of the slug carried by the concave shearing surface of the tool. Following removal of the tool with the slug frictionally held thereto, the rod 33 is inserted in the bore 32 and forced downwardly to force the slug out of frictional engagement with the punches 30 and eject the same from the tool 25.

Fig. 1 illustrates the insert 14 with the partition 21 removed therefrom thus exposing the interior of the duct 10 for electrical fitting alignment therewith. An electrical fitting 35 of the type disclosed in my copending application, Serial No. 543,960, filed October 31, 1955, is illustrated as being fixedly attached to the insert 14 in operative alignment with the opening 13 in the duct 10. The fitting 35 is provided with a housing formed from a removable top portion 36 of arcuate outline and a floor contacting bottom portion 37. The interior of the housing is generally hollow to receive therein wiring (not shown) fed upwardly through the opening 13 from the duct 10. The top and bottom housing portions 36 and 37 cooperate with one another to hold a service outlet 38 which is suitably wired interiorly of the fitting 35. The top housing portion 36 readily removable for access into the interior of the fitting 35 to attach the same to the insert 14.

The inner surface of the lower housing portion 37 carries oppositely positioned and inwardly directed mounting flanges 41 of the type fully disclosed in my copending application. The flanges 41 are provided with openings through which extend fitting attaching screws 42 threadedly received in the tapped holes 20 of the projections 19 of the insert 14. Following the removal of the partition 21, the lower housing portion 37 of the fitting 35 is placed over the opening extending into the duct 10 and the screws 42 are received through the flanges 41 and threadedly advanced into the openings 20 of the projections 19. The lower housing portion 37 is brought into tight engagement with the top surface of the floor covering 12 surrounding the opening leading into the duct 10 by complete tightening of the screws 42. Wiring is fished or drawn upwardly from the duct 10 through the insert 14 and into the lower housing portion 37 wherein it is connected with the service outlet 38. The top housing portion 36 is then suitably attached to the lower housing portion 37 and the fitting 35 is completely assembled for immediate operation. With the provision of the oval shaped base portion 15 of the insert 14 which expands upwardly toward engagement with the wall portion 18, the wiring carried by the duct may be readily fished or drawn through the insert 14 into the fitting 35. The wide upwardly expanding base portion 15, as particularly shown in Fig. 5, provides a substantially large area through which the wiring may be readily drawn.

From the foregoing, it will be noted that the duct outlet insert 14 of the present invention incorporates therein a number of improved structural features. The insert itself is seamless thus providing water-tight covering action for the opening in the duct. The insert is of uncomplicated structural arrangement particularly adapting the same for inexpensive casting without necessitating machine finishing. The insert is readily and easily applied to the duct 10 and the arrangement of the same provides for the use of position locating means in preparation for subsequent use. By reason of the insert being inexpensively formed, any number of the same may be readily used to provide a fully accessible underfloor wire distribution system even though there is a good possibility that some of the duct openings covered by the insert will never be utilized for fitting mounting purposes.

Upon placing the duct opening into service, the insert itself is not removed but only a portion thereof is readily separated therefrom and the projections of the insert are used to fixedly interconnect an electrical fitting thereto in alignment with the opening into the duct. Thus the projections serve not only to carry duct opening locating means but further serve to provide for fixed attachment of an electrical fitting in alignment with the duct opening. The flange attaching structural feature of the electrical fitting is particularly advantageous in preventing inadvertent displacement of the fitting during extended use of the same. No threaded attachments are used of the type subject to inadvertent rotation of the fitting into a loosened condition and the fitting itself may be readily applied in clamped relation with the top surface of the floor structure without damaging the exterior finish of the same by application of a wrench or without unnecessarily scratching the surrounding floor surface. The particular advantages of the flange mounting arrangement of the electrical fitting are fully covered in my copending application.

The shearing tool described is of uncomplicated arrangement and may be economically manufactured for efficient use with the insert of the present invention. With the interfitting relation of the projections of the the insert and the grooves carrier by the tool, the removal of the partition wall will always be properly obtained. The tool will only fit within the wall portion of the insert with the projections received within the grooves and in this manner the projections will never be subject to damage to an extent that it is necessary to completely remove the insert. With the use of the insert of the present invention, no difficulties are encountered insofar as corrosive destruction is concerned. There are no threaded portions which must remain undamaged in order for the insert to function properly and the insert itself is not removed from its operative association with the duct thus causing a substantial waste in material when an electrical fitting is attached in communication with the duct. Still further, no special adaptor or standpipe is used in interconnecting the electrical fitting with the opening in the duct.

Obviously many modification and variations of the invention as hereinbefore set forth may be made without departing from the spirit and scope thereof, and therefore only such limitations should be imposed as are indicated in the appended claims.

I claim:

1. A duct outlet insert for fixing in covering alignment with an opening in an element of an underfloor wire distribution system, said insert including a radially directed flange-like base portion having integrally formed therewith inwardly of the margin thereof an upstanding wall portion defining internally thereof a transverse area for alignment with said opening, said base portion carrying a depending flange receivable in said opening, said flange being located radially inwardly of the margin of said base portion to an extent which is no greater than that of said wall portion, electrical fitting attaching means carried by said wall portion, and a readily shearable partition formed integral with said wall portion and extending across said area internally of said wall portion.

2. A duct outlet insert for fixing in covering alignment with an opening in a duct element of an underfloor wire distribution system, said insert including a radially directed flange-like base portion of oval convex shape having integrally formed therewith centrally thereof an upstanding wall portion defining internally thereof a transverse area for alignment with said opening, said base portion carrying a depending flange receivable in said opening, said flange being located radially inwardly of the margin of said base portion to an extent which is no greater than that of said wall portion, the inner part of said base portion expanding upwardly into integral formation with said wall portion to define said convex shape, electrical fitting attaching means carried by said wall portion, and a readily shearable partition formed integral with said wall portion and extending across said area internally of said wall portion.

3. A duct outlet insert for fixing in covering alignment with an opening in an element of an underfloor wire distribution system, said insert including a radially directed flange-like base portion having integrally formed therewith inwardly of the margin thereof an upstanding wall portion defining internally thereof a transverse area for alignment with said opening, electrical fitting attaching means carried by said wall portion, and a readily shearable partition formed integral with said wall portion and extending across said area internally of said wall portion, said attaching means being spaced, inwardly projecting, lug-like members, each of which is formed integral with the inner surface of said wall portion and carrying threaded openings therein.

4. A duct outlet insert for fixing in covering alignment with an opening in an element of an underfloor wire distribution system, said insert including a radially directed flange-like base portion having integrally formed therewith inwardly of the margin thereof an upstanding wall portion defining internally thereof a transverse area for alignment with said opening, electrical fitting attaching means carried by said wall portion, and a readily shearable partition formed integral with said wall portion and extending across said area internally of said wall portion, said attaching means being spaced, inwardly projecting, lug-like members, each of which is formed integral with the inner surface of said wall portion and carrying threaded openings therein, said partition being located below the top surfaces of said lug-like members.

5. A duct outlet insert for fixing in covering alignment with an opening in a duct element of an underfloor wire distribution system, said insert including a radially directed flange-like base portion of oval convex shape having integrally formed therewith centrally thereof a cylindrical upstanding wall portion defining internally thereof a transverse area for alignment with said opening, said base portion carrying a depending flange receivable in said opening, said flange being located radially inwardly of the margin of said base portion to an extent which is no greater than that of said wall portion, the inner part of said base portion extending upwardly into integral formation with said wall portion to define said convex shape, electrical fitting attaching means carried by said wall portion, and a substantially circular readily shearable partition formed integral with said wall portion and extending across said area internally of said wall portion, said attaching means being spaced, inwardly projecting, lug-like members, each of which is formed integral with the inner surface of said wall portion and carrying threaded openings therein, said partition being located below the top surfaces of said lug-like members.

6. A duct element forming a part of an underfloor wire distribution system buried in the floor of a building structure, said duct element having an oval shaped opening in the top thereof into which is received a depending flange of an oval shaped base portion of a duct outlet insert covering said opening, said flange being located radially inwardly of the margin of said base portion with said base portion overlapping the material of said duct element surrounding said opening, said base portion having integrally formed therewith centrally thereof an upstanding cylindrical wall portion, said flange being located radially inwardly of the margin of said base portion to an extent which is no greater than that of said wall portion, electrical fitting attaching means carried by said wall portion, a shearable partition formed integral with said wall portion and covering an internal transverse cylindrical area defined thereby, the inner part of said base portion expanding upwardly into integral formation with said wall portion, said attaching means being spaced, inwardly projecting, lug-like members, each of which is formed integral with the inner surface of said wall portion and carrying threaded openings therein, said partition being located below the top surfaces of said lug-like members, and position locating means threadedly received in the openings in said lug-like members and extending upwardly through the floor material covering said duct element and said insert with the top ends of the same exposed on the top surface of said floor.

7. For use with a duct outlet insert fixed in alignment with an opening in a duct element of an underfloor wire distribution system, said insert including an upstanding wall portion defining internally thereof a transverse area in alignment with said opening, electrical fitting attaching means carried by said wall portion, said attaching means being in the form of spaced, inwardly projecting, lug-like members, each of which is formed integral with the inner surface of said wall portion and carrying threaded openings therein, and a readily shearable partition formed integral with said wall portion and extending across said area internally of said wall portion, the provision of a partition removing tool having a partition shearing portion of generally concave surface configuration defining oppositely spaced depending shearing edges of generally convex configuration, each of said edges having a recessed portion to receive therein an attaching means carried by said wall portion, said partition shearing portion being receivable within said wall portion to separate the partition therefrom.

8. For use with a duct outlet insert fixed in alignment with an opening in a duct element of an underfloor wire distribution system, said insert including an upstanding wall portion defining internally thereof a transverse area in alignment with said opening, electrical fitting attaching means carried by said wall portion, said attaching means being in the form of spaced, inwardly projecting, lug-like members, each of which is formed integral with the inner surface of said wall portion and carrying threaded openings therein, and a readily shearable partition formed integral with said wall portion and extending across said area internally of said wall portion, the provision of a partition removing tool having a partition shearing portion of generally concave surface configuration defining oppositely spaced depending shearing edges of generally convex configuration, each of said edges having a recessed portion to receive therein an attaching means carried by said wall portion, said partition shearing portion being receivable within said wall portion to separate the partition therefrom, and punch elements extending outwardly of said shearing portion to be received through said partition prior to the shearing thereof for wedged engagement with said partition upon conformation of said partition with the concave surface of said shearing portion following separation thereof from said wall portion.

9. For use with a duct outlet insert fixed in alignment with an opening in an element of an underfloor wire distribution system, said insert including an upstanding wall portion defining internally thereof a transverse area in alignment with said opening, electrical fitting attaching means carried by said wall portion, said attaching means being in the form of spaced, inwardly projecting, lug-like members, each of which is formed integral with the inner surface of said wall portion and carrying threaded openings therein, and a readily shearable partition formed integral with said wall portion and extending across said area internally of said wall portion, the provision of a partition removing tool having a partition shearing portion of generally concave surface configuration defining oppositely spaced depending shearing edges of generally convex configuration, each of said edges having a recessed portion to receive therein an attaching means carried by said wall portion, said partition shearing portion being receivable within said wall portion to separate the partition therefrom, an elongated handle attached to said shearing portion and having an ejection rod extending therethrough and through said shearing portion for movement into ejecting engagement with said partition following separation thereof and withdrawal of said tool out of said wall portion, and punch elements extending outwardly of said shearing portion to be received through said partition prior to the shearing thereof for wedged engagement with said partition upon conformation of said partition with the concave surface of said shearing portion following separation thereof from said wall portion.

10. For use with a duct outlet insert fixed in alignment with an opening in a duct element of an underfloor wire distribution system, said insert including a cylindrical upstanding wall portion defining internally thereof a transverse area in alignment with said opening, electrical fitting attaching means carried by said wall portion, a substantially circular readily shearable partition formed integral with said wall portion and extending across said area internally of said wall portion, said attaching means being spaced, inwardly projecting, lug-like members, each of which is formed integral with the inner surface of said wall portion and carrying threaded openings therein, said partition being located below the top surfaces of said lug-like members, the provision of a partition removing tool having a partition shearing portion of generally concave surface configuration defining oppositely spaced depending shearing edges of generally convex configuration, each of said edges having a recessed portion to receive therein a lug-like member carried by said wall portion, said partition shearing portion being receivable within said wall portion to separate the partition therefrom, and punch elements extending outwardly of said shearing portion to be received through said partition prior to the shearing thereof for wedged engagement with said partition upon conformation of said partition with the concave surface of said shearing portion following separation thereof from said wall portion.

11. For use with a duct outlet insert fixed in alignment with an opening in a duct element of an underfloor wire distribution system, said insert including a cylindrical upstanding wall portion defining internally thereof a transverse area in alignment with said opening, electrical fitting attaching means carried by said wall portion, a substantially circular readily shearable partition formed integral with said wall portion and extending across said area internally of said wall portion, said attaching means being spaced, inwardly projecting, lug-like members, each of which is formed integral with the inner surface of said wall portion and carrying threaded openings therein, said partition being located below the top surfaces of said lug-like members, the provision of a partition removing tool having a partition shearing portion of generally concave surface configuration defining oppositely spaced depending shearing edges of generally convex configuration, each of said edges having a recessed portion to receive therein a lug-like member carried by said wall portion, said partition shearing portion being receivable within said wall portion to separate the partition therefrom, an elongated handle attached to said shearing portion and having an ejection rod extending therethrough and through said shearing portion for movement into ejecting engagement with said partition following separation thereof and withdrawal of said tool out of said wall portion, and punch elements extending outwardly of said shearing portion to be received through said partition prior to the shearing thereof for wedged engagement with said partition upon conformation of said partition with the concave surface of said shearing portion following separation thereof from said wall portion.

References Cited in the file of this patent

UNITED STATES PATENTS

| | | |
|---|---|---|
| 1,229,576 | Boyton et al. | June 12, 1917 |
| 1,715,474 | Sherman | June 4, 1929 |
| 1,954,481 | Knight | Apr. 10, 1934 |
| 1,965,087 | Sharp | July 3, 1934 |
| 1,984,356 | Abbott | Dec. 18, 1934 |
| 2,097,394 | Fullman | Oct. 26, 1937 |
| 2,207,301 | Robinson | July 9, 1940 |
| 2,297,139 | Flachbarth | Sept. 29, 1942 |
| 2,830,662 | Marcum | Apr. 15, 1958 |

FOREIGN PATENTS

| | | |
|---|---|---|
| 459,979 | Great Britain | Jan. 19, 1937 |